Jan. 27, 1959     C. E. WINTER     2,870,644
IMPROVED MULTIPLE SPEED GEAR TRANSMISSION
Filed June 10, 1957     3 Sheets-Sheet 1

INVENTOR.
CARL E. WINTER
BY Elliott & Pastoriza
ATTORNEYS

Jan. 27, 1959 C. E. WINTER 2,870,644
IMPROVED MULTIPLE SPEED GEAR TRANSMISSION
Filed June 10, 1957 3 Sheets-Sheet 2

INVENTOR.
CARL E. WINTER
BY Elliott & Pastoriza
ATTORNEYS

Jan. 27, 1959  C. E. WINTER  2,870,644
IMPROVED MULTIPLE SPEED GEAR TRANSMISSION
Filed June 10, 1957  3 Sheets—Sheet 3

INVENTOR.
CARL E. WINTER
BY Elliott & Pastoriza
ATTORNEYS

United States Patent Office

2,870,644
Patented Jan. 27, 1959

2,870,644

IMPROVED MULTIPLE SPEED GEAR TRANSMISSION

Carl E. Winter, Los Angeles, Calif.

Application June 10, 1957, Serial No. 664,786

15 Claims. (Cl. 74—351)

This invention generally relates to a gear transmission and more particularly to an improved multiple speed gear transmission for particular application in instances where a variable output speed is desired from a constant speed source of input power.

It is appreciated that many types of different variable speed devices are available on the market today. Of the mechanical variable speed devices available, most of the units are either complex in design or inefficient in operation. At the present time no simple variable speed drives are available which provide in a single unit multiple output speeds with positive gear transmission.

It is, therefore, an object of the present invention to provide a multiple speed gear transmission employing positive gearing.

Another object of the present invention is to provide an improved multiple speed gear transmission, which may be manufactured at a relatively low cost, and yet which is rugged and simple in its design.

A still further object of the present invention is to provide an improved multiple speed gear transmission which will yield an appreciable number of output speeds limited only by the dimensional considerations, and also which in a preferred embodiment will yield such output speeds in the reverse as well as the forward direction.

These and other objects and advantages of the present invention are generally achieved by providing in a gear transmission an output shaft with a first driven pinion mounted thereon. First input rotating means are additionally provided and include first gear rack means which are positioned so as to mesh with the pinion throughout one given portion of a cycle of revolution of the input rotating means. In other words, the gear rack means are provided in a configuration on the input rotating means, such that the gear rack means will only be engaging the pinion during the given portion of each revolution of the input rotating means.

In a preferred construction, second input rotating means are similarly provided to include second gear rack means thereon, which are positioned relative to the first input rotating means so as to drive the pinion throughout the remaining portion of the given cycle of revolution. With such an arrangement, it will be appreciated that the pinion will be continuously driven either by the first input rotating means or by the second input rotating means.

A better understanding of the present invention will be had by reference to the drawings, showing illustrative embodiments, and in which.

Figure 1:
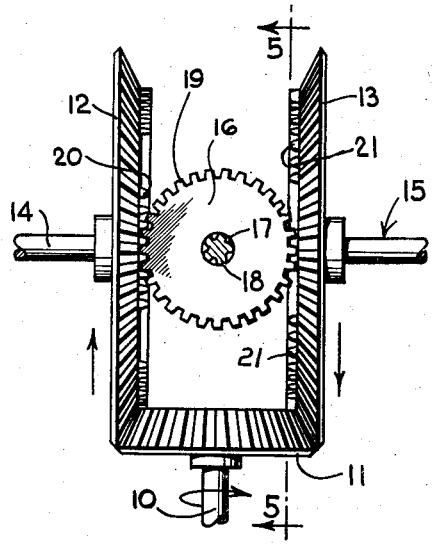
Figure 1 is an end view of an improved multiple speed gear transmission according to the present invention, partially in schematic form.

Referring now to the drawings, there is shown in Figure 1 a preferred embodiment of an improved multiple speed gear transmission, in accordance with the present invention, which may be provided with an input shaft 10 having coupled thereto a beveled gear 11. The beveled gear 11 is, in turn, adapted to drive first and second input rotating means, respectively, in the form of disc-like plates 12 and 13. The plates 12 and 13 may be supported from axles 14 and 15, respectively.

Interposed between the plates 12 and 13 is a pinion 16 provided with a bore 17 of configuration for mounting on a splined shaft. The general operation is such that the input shaft 10 drives the plates 12 and 13 through the bevel gear 11. The plates 12 and 13, in turn, drive the pinion 16, which effects rotation of the shaft 18. It will be apreciated that in view of the mechanical arrangement the plates 12 and 13 will be rotating in opposite directions, as indicated by the arrows.

The pinion 16 is provided with teeth 19 which are adapted to engage gear rack sectors 20 disposed on the plate 12 and sectors 21 disposed on the plate 13.

Figures 2, 3:
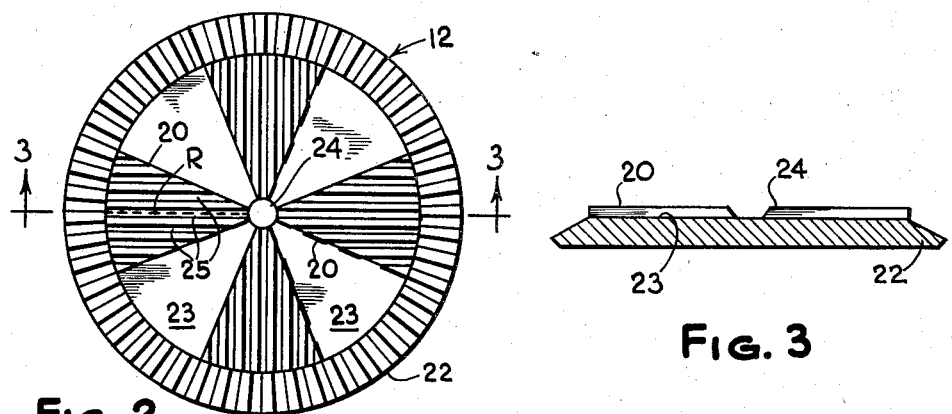
Figure 2 is a plan view of one of the disc-like plates of the input rotating means shown in Figure 1.
Figure 3 is a side view of the plate shown in Figure 2 taken in the direction of the arrows 3—3.

The manner in which the plates 12 and 13 effect movement of the pinion will be more clearly understood with reference to Figure 2. In this view, one of the plates 12 is shown in plan view, although it will be appreciated that both plates are constructed identically. Plate 12 includes peripheral or circumferential bevel gearing 22 which is adapted to mesh with the bevel gear 11. The inner surface of the plate 12 is provided with four sector shaped gear racks 20, as heretofore mentioned, which are alternately spaced between non-engaging surface sectors 23. Each of the gear rack sectors 20, as shown in the illustrative embodiment, subtends an angle of 45° as do the surface sectors 23.

The sectors 20 are comprised of a plurality of gear teeth 25 of conventional involute construction. The teeth 25 are equidistantly spaced and are parallel to a line R, which radially bisects the particular angle of the sector. The number and angular spacing of gear sectors distributed about the surface of the plate 12 may be varied according to the design requirements and operating characteristics desired, as hereafter described, although it is important that each gear sector 20 be disposed between surface sectors 23 and further that opposing gear sectors and surface sectors subtend equal angles.

It is further desirable that the inner radial ends of the teeth 25 be chamfered as more clearly shown in the view of Figure 3 to form a beveled bore 24 in the center of the plate 12.

During the assembly operation of the transmission shown in Figure 1, the plates 12 and 13 are brought into engagement with the pinion in a manner such that, for example, one of the sectors 20 will have its last tooth in engagement with the pinion teeth 19, while the first tooth on one of the sectors 21 is about to engage the teeth 19 of the pinion. Upon assembly in this manner, the operation of the drive will be such that the teeth 19 of the pinion will alternately engage the rack sectors 20 of plate 12 and the rack sectors 21 of plate 13, whereby the pinion 16 will be continuously driven, although alternately by the plates 12 and 13. This operation is more clearly shown in the view of Figure 4.

Figure 4:
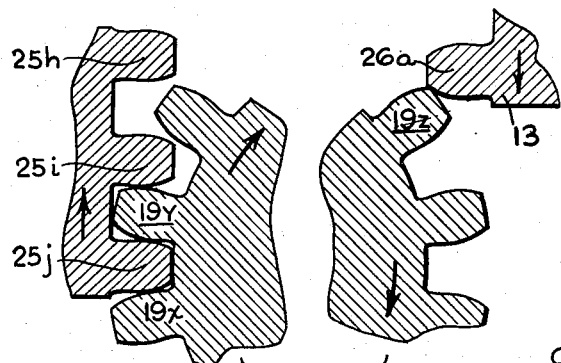
Figure 4 is an enlarged view of the co-operative action between the teeth of the pinion and the teeth of the respective gear racks as shown in Figure 1.

In Figure 4, partial sections of the plates 12 and 13 have been shown. For convenience, it is assumed that each of the sectors 20 and 21 is provided with ten teeth. The last three teeth of one of the sectors 20 are denoted by 25h, 25i, and 25j. The first tooth of one of the sectors 21 on the plate 13 is denoted by 26a. Scale drawings and models have indicated that as the last tooth 25j is in full meshing engagement with pinion teeth 19x and 19y, for example, the first tooth 26a of one of the sectors 21 will be at a minimum point of engagement with the pinion tooth 19z, for example. The operation of models has shown that by proper relative positioning of the plates 12 and 13, as indicated in Figure 4, that continuous motion may be imparted to the pinion 16, although at any one instance, only one of the plates 12 or 13 will be affecting rotative movement of the pinion. The importance of this fact will be brought out as the specification proceeds.

Figure 5:
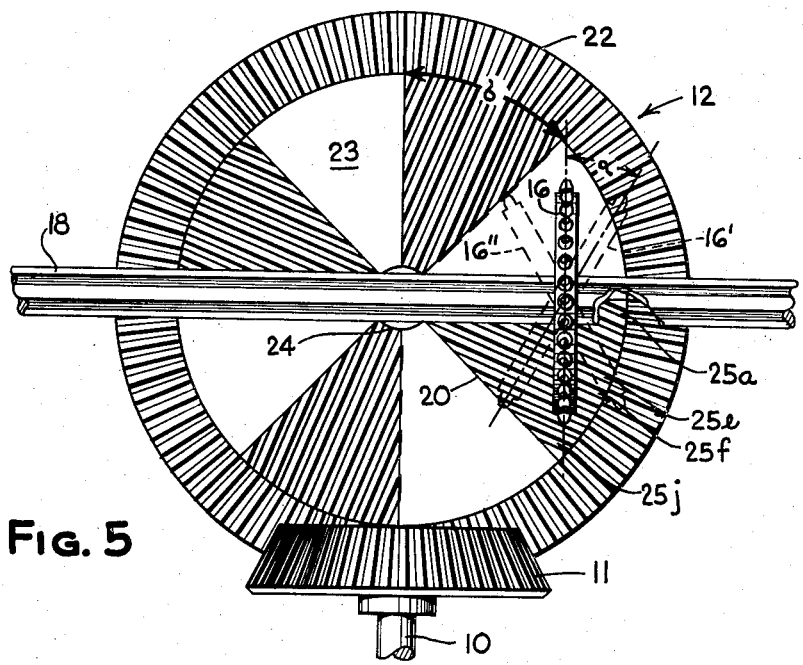
Figure 5 is a side view of the transmission of Figure 1, taken generally in the direction of the arrows 5—5 thereof.

The operation of the improved multiple speed gear transmission of the present invention as well as certain additional features thereof may be more clearly described by reference to Figure 5. In this view, the same numerals are meant to designate similar portions of the apparatus as employed in Figures 1 through 4. The pinion 16 has a normal plane of rotation about the axis of the shaft 18 as indicated in Figure 5 by the solid lines. However, when the teeth 19 of the pinion 16 come into engagement, for example, with the first tooth 25a of one of the gear sector racks 20, the pinion 16 will have a tendency to turn towards the dotted line position indicated by the numeral 16' so as to be normal to the tooth 25a. The maximum angular movement of the pinion will be dependent upon the angle α which the particular gear sector rack 20 subtends. In other words, if the gear sector rack 20 subtends an angle of 45°, as used for purposes of illustration, the maximum off center position of the pinion will be an angle β equal to one-half of the angle α, or 22½°. It will be appreciated, however, that after the pinion has assumed the position indicated by 16', it will gradually move back towards its normal solid line position 16 as it finally comes into engagement with the centrally disposed teeth 25e and 25f. Thereafter it will gradually move through angular displacement towards the left until it finally reaches the position as indicated by the dotted lines 16" when it contacts the last tooth 25j. Thus, it will rotate 22½° off its normal center in each direction along the shaft 18 as it engages one gear rack sector 20 subtending an arc of 45°.

As a consequence of this angular movement of the pinion 16, an important feature of the present invention is to provide a suitable means whereby the pinion 16 may either cant itself for alignment with the teeth 25 or whereby the pinion 16 may be maintained in its normal plane and yet firmly engage and mesh with the teeth 25 of the sectors 20 as they drivingly engage it.

Figure 6:
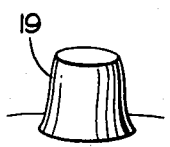
Figure 6 is an enlarged view of one of the teeth of the pinion of Figure 1.

Assuming that conventional involute teeth are employed for the gear sectors 20, a preferred approach to this problem is to provide the pinion 16 with teeth 19 which will continuously engage the teeth 25 of the gear sector 20 and yet not cause angular displacement of the pinion to the dotted line positions of 16' and 16". Towards this end, experimental use has shown that by employing a "peg" type involute stub tooth, as illustrated in Figure 6, this desired result may be obtained. The "peg" type tooth is characterized by the fact that it generally comprises a cylindrical tooth element on which an involute has been imposed. With such a design, any given side of the tooth may be used as an engaging means by developing line to line contact with the gear rack teeth. Although the face width with such a construction becomes finite, this type of tooth has the advantage of being able to engage the conventional involute teeth 25 of the gear rack sector regardless of the angle of contact. Thus, the pinion 16 will remain in a vertical position.

It will be appreciated, nevertheless, that alternate constructions may be employed wherein the pinion 16 is permitted to be angularly displaced to the positions of 16' and 16" while at the same time remaining rotatably coupled to the splined shaft 18.

Figure 7:
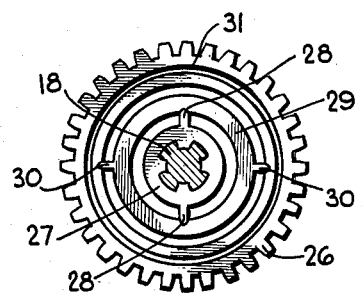
Figure 7 is a sectional view through a modified embodiment of the pinion incorporated in a gimbal structure.

One possible construction is to use a pinion 26 as shown in Figure 7, which is coupled to a conventional gimbal. The gimbal may be provided with an inner ring 27 adapted to be received on the splined shaft 18 and provided with pivot arms 28 coupled to an outer ring 29. The outer ring 29 may similarly be provided with pivot arms 30, in turn, coupled to the annular type pinion 26. With such a construction, it will be appreciated that regardless of the movement of the pinion 26, in a manner illustrated in Figure 5, no binding action will occur and the pinion may be continuously driven by the teeth 25 of the particular gear sector 20. The gimbal structure may be advantageously employed in applications in which relatively high loads are transmitted.

It is apparent that many different constructions may be employed wherein the pinion may be permitted to angularly displace itself, as indicated in Figure 5, and yet remain rotatably coupled to the shaft 18. However, it is a preferred construction under relatively low load conditions to employ the "peg" type teeth as shown in Figure 6, whereby the pinion 16 remains continuously in the same plane of rotation and yet engages all of the teeth 25 of the gear sector plate 20 regardless of the angle of contact.

It will be evident that the speed of rotation of the pinion 16, again referring to the view of Figure 5, will be dependent upon its axial displacement from the chamfered or beveled bore 24 or the center of rotation of the input rotative means. This fact is even more clearly evident by realizing that when the pinion is disposed immediately adjacent the beveled bore 23, it will be contacting only one or two teeth 25e and 25f, whereas when it is disposed near the rim 22, it will be contacting and meshing with all the teeth of the sector gear rack 20. Thus, in order to vary the speed of the output shaft, it is merely necessary to move the pinion 16 along the shaft 18 to any one of a multiple number of positions, limited only by the dimensions and design of the particular drive involved. For this reason, a spline type shaft 18 has been illustrated, whereby the pinion 16 may be moved axially thereon while still maintaining rigid rotative coupled relationship therewith.

The particular force means employed for axially shifting the pinion 16 or 26 to obtain variable output speeds has not been illustrated or described as many different types of conventional mechanisms may be used.

Figure 8:
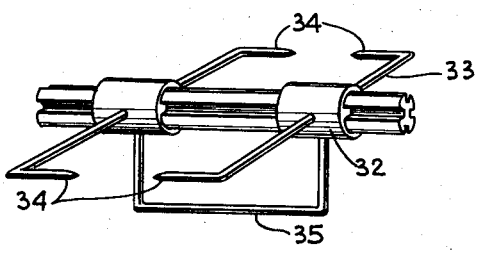
Figure 8 is a view of a carriage assembly for actuation of the pinion in an axial direction.

In Figure 8, there is shown generally a carriage assembly, which might be incorporated, for example, with the gimbal structure type of pinion of Figure 7. For this purpose, the pinion 26 could be provided with an annular groove or race 31 on each side thereof. The carriage assembly comprises a pair of spaced sleeve members 32 having rigidly secured thereto arms 33 terminating in axially extending fingers 34. With such a construction, the pinion 26 would be interposed between the sleeves 30 that its races 31 would receive the oppositely disposed fingers 34. The fingers 34, in co-operation with the races 31 would then function to allow pivotable movement of the pinion to the dotted line positions of Figure 5 as well as rotation around the shaft, while preventing angular movement tending to shift the pinion out of normal relationship to the plates 12 and 13. The carriage assembly might also be employed, in view of the structural link 35, to transmit axial force to the pinion during speed changes.

It will be apparent that the pinion 16 cannot be moved axially on the shaft 18 so long as the plate 12 or 13 is stationary, unless the teeth 25 of the gear sector rack 20 are in parallel alignment with the shaft 18. However, because of the sliding engagement of the teeth 19 with the teeth 25, as the plate 12 is rotated, the pinion 16 may be moved inwardly or outwardly at a rate dependent only upon the relative speeds of rotation of the pinion and the input rotative means of the plates 12 and 13. It is evident, as heretofore stated, that any type of force means may be employed for the purpose of moving the pinion 16 in an axial direction along the shaft 18.

In order to effect reverse rotation of the pinion 16 and in turn the shaft 18, it is merely necessary to move the pinion axially along the shaft until it is on the other side of the bore 24, or on the left hand side thereof as viewed in Figure 5. When it is desired to have the pinion out of engagement with the gear sectors 20, it is merely necessary to move the pinion to alignment with the central position or bore 24 of the plate 12, whereby it will not be in contact with either of the plates 12 or 13. For this purpose, the bore 24 must be of sufficient dimensions to accommodate the face width of the pinion and the depth of the teeth 19 without engaging these parts.

From a practical standpoint, it is desirable to have the gear sector areas 20 and surface areas 23 angularly equal. It is entirely conceivable to employ unequal angular areas for these elements so long as the plates 12 and 13 have identical configurations and so long as each gear sector is disposed between surface sectors and vice versa.

It will be appreciated that at certain specific circumferences of the plates 12 and 13, the sum of tooth widths will not exactly equal an even integer of teeth. Of course, dependent on the manufacturing tolerances, slight variations from an even number of teeth will not affect proper meshing of the pinion teeth 19 with teeth 20 on plate 12, for example, continuously throughout 360 degrees of rotation. On the other hand, it will be realized that at certain circumferences the sum of tooth widths may be sufficiently greater or less than a tooth width so as to cause binding if manufacturing tolerances are not of such a degree as to permit sliding engagement of the engaging teeth. Therefore, it will be necessary from a practical standpoint to reduce the width of a tooth or teeth on such critical circumferences so as to facilitate meshing. Towards this end, if the "peg" type tooth is being used, the addendum may be conically shaped to terminate at a point at the top thereof. With the gimbal arrangement of involute teeth on the pinion, the addendum would similarly be provided with a triangular cross section. As a consequence, assuming a similar and corresponding modification on the sector tooth or teeth, the possibility of binding may for practical purposes be eliminated.

Figure 10:
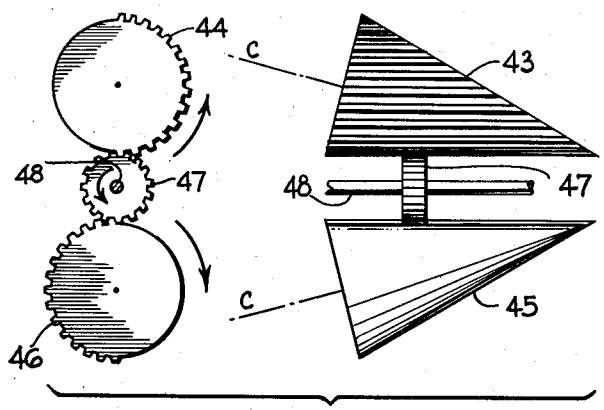
Figure 10 is another embodiment of the gear transmission of the present invention, in which the disc-like plates are replaced by conical members; and, Figure 11 is another embodiment of the gear transmission of the present invention, in which two pinions are employed with one disc-like plate.
Figure 11:
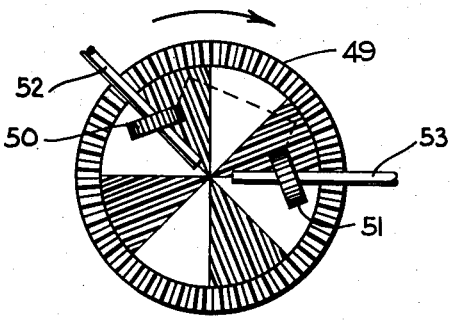

Although a preferred mechanical arrangement for the improved multiple speed gear drive of the present invention has been described, it will be apparent to those skilled in the art that the invention may take other forms. In this regard, certain other schematic arrangements are illustrated in Figures 9 through 11.

Figure 9:
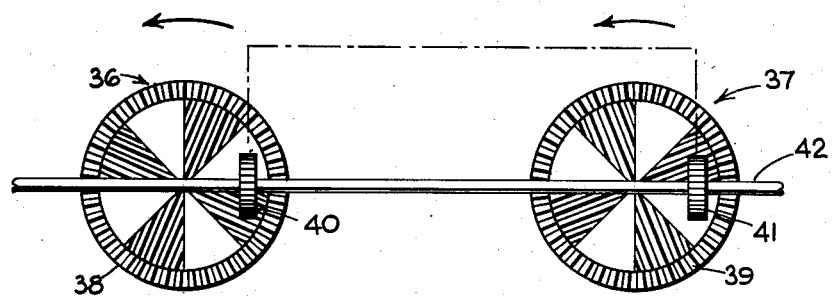
Figure 9 is another embodiment of the gear transmission of the present invention, in which two pinions are employed.

In Figure 9, an arrangement is employed including plates 36 and 37 rotating in the same direction and in line with each other. The plates 36 and 37 are provided with beveled gearing 38 and 39, and are otherwise constructed similarly to the plate 12 as described in conjunction with Figure 2. Instead of employing one pinion, as with the embodiment shown in Figures 1 and 5, two pinions 40 and 41 are used on one shaft 42. The actual functioning of the device is similar to the previous embodiment described, except that it is evident that the two pinions must be mechanically tied together so as to effect simultaneous movement when they are displaced axially along the shaft 42 on which they are mounted. It is also apparent that the mechanical linkage, as indicated by the dotted line connection between the pinions 40 and 41, must also function to provide simultaneous angular movement of the pinions in the event "peg" type teeth are not employed. In other words, the working pinion must impart its oscillatory mode of motion to the non-working pinion to enable the latter to incline at the correct angle necessary to engage respective rack teeth when it meshes therewith. In addition, the pinions 40 and 41 must initially be out of phase in order to provide continuous driving. This type of arrangement has the advantage of decreasing the overall width of the drive, but the disadvantage of increasing it in length as well as complexity of construction.

The same general components of Figure 9, that is, two plates and two pinions, could co-function in other relationships to achieve the same result. Thus, the two plates could be mounted back to back and the two pinions disposed on different output shafts. A mechanical linkage would also be required for the same purposes as heretofore mentioned. In another arrangement the plates could be positioned in line, except to mesh with and drive each other in opposite directions. In such a configuration, the pinions would be mounted on different shafts and geared together with a common output means.

Although the flat type of plate is believed the most practical, it is conceivable to employ other shapes. Thus, in Figure 10 instead of using opposing plates 12 and 13, opposing conical members are employed. A conical member 43, having gear teeth 44 around a part of its peripheral surface, is provided in combination with another conical member 45 having gear teeth 46 similarly around part of its surface. Interposed between the conical members is a pinion 47 mounted on a shaft 48. The conical members 43 and 45 are driven respectively from conventional driving means about their respective axes $c$ and $c'$, whereby a similar result is obtained as with the preferred embodiment. With this type of construction, reverse speeds cannot be realized except with external means or with additional parts. On the other hand, it will be appreciated that the closer to a conical design the plate shape is, the less the problem of binding of adjacent teeth, since the gear rack is rolling away from the pinion teeth.

In Figure 11, another construction is illustrated in which a plate 49, similar to the plate 12, is employed. Instead of using a single pinion, however, two pinions 50 and 51 are mounted on shafts 52 and 53, respectively. With this type of arrangement, one pinion 50 will be contacting the gear sector portions of the plate, while the other pinion 51, for example, will be contacting the blank sector portions. The pinions 50 and 51 will necessarily rotate in different directions. As a consequence their output shafts must, in turn, be coupled to a common output means through gearing or the like. A mechanical linkage further must be provided. The linkage must be coupled between the pinions, as indicated by the dotted lines, so that the pinions will shift axially together, and so that they may be properly angularly oscillated with respect to the plate 49. With this construction, it will be realized that no reversal can be made in the direction of rotation. Thus, this arrangement does not have the flexibility of the preferred embodiment illustrated in Figure 1.

From the foregoing, it will be appreciated that many minor changes and modifications may be made in the construction of the invention without departing from the basic principles of the invention as set forth in the following claims.

What is claimed is:

1. In a gear transmission: a first shaft; a first pinion mounted on said first shaft; first rotating means; first gear rack means on said first rotating means, said first gear rack means being defined by a plurality of parallel teeth and being positioned so as to mesh with and drivingly, engage said pinion continuously throughout one given angular portion of a cycle of a revolution of said first rotating means; and, second means adapted to effect rotation of said first shaft during another given angular portion of said cycle of revolution.

2. The subject matter according to claim 1, in which said second means comprises a second rotating means, and second gear rack means defined by a plurality of parallel teeth on said second rotating means positioned relative to said first rotating means and said pinion so as to drivingly engage and mesh with said pinion continuously throughout said another portion of said given cycle of revolution.

3. The subject matter according to claim 1, in which said second means comprises a second shaft coupled to said first shaft and a second pinion mounted on said second shaft, said second pinion being initially positioned with respect to said first rotating means so as to be in mesh with said first gear rack means during said another portion of said given cycle of revolution.

4. The subject matter according to claim 1, in which said first rotating means includes a first conical member having first gear rack means on a part of the peripheral surface thereof, and in which said second means includes a second conical member having second gear rack means on a part of the peripheral surface thereof, said first conical member and said second conical member being initially positioned relative to said pinion so as to effect rotation of said pinion throughout said given portion and said another portion of said cycle of revolution, respectively.

5. In a gear transmission: a shaft; a first pinion mounted on said shaft; first rotating means; first gear rack means on said first rotating means, said first gear rack means being positioned so as to mesh with said pinion throughout one portion of a cycle of revolution of said first rotating means; second means adapted to effect rotation of said shaft during the remaining portion of said cycle of revolution; said first gear rack means including at least one sector gear rack of given angular width extending radially from the axis and on a surface of said first rotating means; said sector gear rack being defined by a plurality of equidistantly spaced gear teeth, said teeth being parallel to a radial line angularly bisecting said sector section.

6. The subject matter according to claim 5, and force means to effect movement of said pinion along the axis of said output shaft, said pinion being coupled to and axially slidable on said shaft, whereby said pinion may be engaged by said sector gear rack at different radial distances from the axis of said input rotating means.

7. The subject matter according to claim 5, in which said second means comprises a second rotating means; second gear rack means on said second rotating means positioned so as to mesh with said pinion throughout the remaining portion of said cycle of revolution, said second gear rack means having a non-engaging surface sector of congruous area to said one sector gear rack of said first input rotating means.

8. The subject matter according to claim 7, and coupling means interposed between said output shaft and said pinion enabling pivotal movement of said pinion with respect to said shaft.

9. The subject matter according to claim 7, in which the teeth of said first gear rack means and the teeth of said second gear rack means are of conventional involute construction, and in which the teeth of said pinion are of "peg" type construction characterized by an involute imposed on a cylinder.

10. An improved multiple speed gear transmission comprising: an output shaft; a pinion drivingly mounted on said shaft; input driving means; a first disc coupled to said input driving means; a second disc coupled to said input driving means, said second disc being axially aligned and in opposing relation to said first disc, and said pinion being interposed between said first disc and said second disc in a plane normal to said first disc and said second disc; first sector gear rack means characterized by parallel teeth on an inner surface portion of said first disc; second sector gear rack means characterized by parallel teeth on an inner surface portion of said second disc, said first gear rack means and said second gear rack means being provided and positioned so as to alternately engage said pinion.

11. An improved multiple speed gear transmission according to claim 10, in which said first disc and said second disc, respectively, include at least one sector gear rack of given angular width extending radially from the axis thereof, said sector gear rack being characterized by a plurality of equidistantly spaced gear teeth, said teeth being parallel to a radial line angularly bisecting said sector gear rack.

12. The subject matter according to claim 11, in which coupling means are interposed between said output shaft and said pinion enable pivotal movement of said pinion with respect to said shaft.

13. The subject matter according to claim 11, in which the teeth of said first gear rack means and the teeth of said second gear rack means are of conventional involute construction, and in which the teeth of said pinion are of "peg" type construction characterized by an involute imposed on a cylinder.

14. The subject matter according to claim 11, and force means to effect movement of said pinion along the axis of said output shaft, whereby said pinion may be engaged by said first gear rack sector means and said second gear rack sector means at different radial distances from the axis of said first disc and said second disc.

15. The subject matter according to claim 14, in which co-operative means are provided on said first disc and said second disc with respect to said pinion, whereby said pinion is not engaged by said first disc and said second disc when disposed in line with the axis of said first disc and said second disc.

References Cited in the file of this patent
UNITED STATES PATENTS

| | | |
|---|---|---|
| 542,095 | Muehleisen | July 2, 1895 |
| 870,715 | Cowles | Nov. 12, 1907 |
| 1,896,462 | Nietsche | Feb. 7, 1933 |

FOREIGN PATENTS

| | | |
|---|---|---|
| 221,949 | Germany | May 13, 1910 |
| 2,693 | Great Britain | Feb. 4, 1909 |
| 696,477 | France | Dec. 31, 1930 |